United States Patent
Ikeda et al.

(10) Patent No.: US 12,111,283 B2
(45) Date of Patent: Oct. 8, 2024

(54) GAS SENSOR ELEMENT AND GAS SENSOR

(71) Applicant: DENSO CORPORATION, Kariya (JP)

(72) Inventors: Masatoshi Ikeda, Nisshin (JP); Shota Hagino, Nisshin (JP); Chika Namekata, Kariya (JP)

(73) Assignee: DENSO CORPORATION, Kariya (JP)

( * ) Notice: Subject to any disclaimer, the term of this patent is extended or adjusted under 35 U.S.C. 154(b) by 865 days.

(21) Appl. No.: 16/813,995

(22) Filed: Mar. 10, 2020

(65) Prior Publication Data
US 2020/0209184 A1    Jul. 2, 2020

Related U.S. Application Data (63) Continuation of application No. PCT/JP2018/032909, filed on Sep. 5, 2018.

(30) Foreign Application Priority Data

Sep. 15, 2017 (JP) ................. 2017-178178

(51) Int. Cl.
G01N 27/409 (2006.01)
G01N 27/407 (2006.01)

(52) U.S. Cl.
CPC ....... G01N 27/409 (2013.01); G01N 27/4071 (2013.01); G01N 27/4073 (2013.01); G01N 27/4076 (2013.01)

(58) Field of Classification Search
CPC ............. G01N 27/409; G01N 27/4071; G01N 27/4073; G01N 27/4076; G01N 27/4075; G01N 27/406-41; G01N 33/0004-0075
See application file for complete search history.

(56) References Cited

U.S. PATENT DOCUMENTS

| 4,863,583 A | * | 9/1989 | Kurachi | ............. | G01N 27/4075 |
|             |   |        |         |              | 204/429 |
| 5,593,558 A | * | 1/1997 | Sugino | ............... | G01N 27/4075 |
|             |   |        |         |              | 427/126.3 |

(Continued)

FOREIGN PATENT DOCUMENTS

| JP | 2004-061323 |   | 2/2004 |
| JP | 2004061323 A | * | 2/2004 |

(Continued)

OTHER PUBLICATIONS

Tokunaga et al. (JP 2004/061323 A, machine translation) (Year: 2004).*

(Continued)

*Primary Examiner* — Joshua L Allen
(74) *Attorney, Agent, or Firm* — Nixon & Vanderhye P.C.

(57) ABSTRACT

A gas sensor element includes a solid electrolyte body having oxygen ion conductivity, a measurement electrode provided on one surface of the solid electrolyte body and exposed to a measurement gas, and a reference electrode provided on the other surface of the solid electrolyte body and exposed to a reference gas. Both the measurement electrode and the reference electrode include noble metal particles, solid electrolyte particles having oxygen ion conductivity, and pores. The measurement electrode comprises a surface measurement electrode layer comprising a surface serving as a contact surface with the measurement gas and an intermediate measurement electrode layer disposed in contact with a surface at solid electrolyte body side of the surface measurement electrode layer. The surface measurement electrode layer has a higher porosity than the intermediate measurement electrode layer has. The gas sensor comprises the gas sensor element.

9 Claims, 7 Drawing Sheets

(56) References Cited

U.S. PATENT DOCUMENTS

| | | | | |
|---|---|---|---|---|
| 2002/0017462 A1* | 2/2002 | Diehl | ................ | G01N 27/4076 |
| | | | | 204/426 |
| 2002/0023838 A1* | 2/2002 | Schneider | .......... | G01N 27/4071 |
| | | | | 427/430.1 |
| 2007/0095662 A1 | 5/2007 | Suzuki | | |
| 2015/0293051 A1 | 10/2015 | Kajiyama et al. | | |

FOREIGN PATENT DOCUMENTS

| | | | | |
|---|---|---|---|---|
| JP | 2007-114216 | | 5/2007 | |
| JP | 2017-518506 | | 7/2017 | |
| WO | WO-2015193084 A1 * | | 12/2015 | ......... G01N 27/4073 |

OTHER PUBLICATIONS

Schneider et al. (WO 2015/193084 A1, machine translation) (Year: 2015).*

* cited by examiner

GAS SENSOR ELEMENT AND GAS SENSOR

CROSS-REFERENCE TO RELATED APPLICATION

This application is a U.S. application under 35 U.S.C. 111(a) and 363 that claims the benefit under 35 U.S.C. 120 from International Application No. PCT/JP2018/032909 filed on Sep. 5, 2018, the entire contents of which are incorporated herein by reference. The present application is also based on Japanese patent application No. 2017-178178 filed on Sep. 15, 2017, the contents of which are incorporated herein by reference.

BACKGROUND

Technical Field

The present disclosure relates to a gas sensor element and a gas sensor.

Background Art

As a gas sensor disposed in an exhaust pipe of an internal combustion engine in the related art, a gas sensor is known that includes, for example, a gas sensor element including a solid electrolyte body having oxygen ion conductivity, a measurement electrode provided on a first surface of the solid electrolyte body and exposed to a measurement gas, and a reference electrode provided on a second surface of the solid electrolyte body and exposed to a reference gas. Each of the electrodes of the gas sensor element generally includes noble metal particles such as Pt, solid electrolyte particles having oxygen ion conductivity, and pores.

SUMMARY

An embodiment of the present disclosure lies in a gas sensor element including a solid electrolyte body, a measurement electrode, and a reference electrode, wherein
both the measurement electrode and the reference electrode include noble metal particles, solid electrolyte particles,
the measurement electrode includes:
a surface measurement electrode layer including and an intermediate measurement electrode layer, and
the surface measurement electrode layer has a higher porosity than the intermediate measurement electrode layer.

Another embodiment of the present disclosure lies in a gas sensor including the gas sensor element.

Note that parenthesized reference signs recited in the claims indicate correspondence relations with specific means described in embodiments described below and do not limit the technical scope of the present disclosure.

BRIEF DESCRIPTION OF THE DRAWINGS

The foregoing and other objects, features, and advantages of the present disclosure will be more apparent from the following detailed description taken with reference to the attached drawings. In the drawings.

DETAILED DESCRIPTION OF THE PREFERRED EMBODIMENTS

The inventor of the present disclosure has studied a gas sensor element and a gas sensor that can reduce the electrode reaction resistance and can suppress an increase in electrode resistivity.

Antecedent document JP 2007-114216 A discloses a gas sensor element in which, for improved responsiveness of a gas sensor, a measurement electrode includes at least two electrode layers with different blend ratios between metal particles and ceramic particles and in which the content of ceramic particles in an electrode layer in the measurement electrode that is closest to a front surface side is larger than that in an electrode layer in the measurement electrode that is closest to a solid electrolyte substrate.

However, the measurement electrode in the conventional gas sensor element has, in the electrode layer closest to the front surface side, a large content of ceramic particles and a small content of metal particles. Thus, the conventional gas sensor element includes a reduced number of three-phase points including metal particles, ceramic particles, and pores (gas) and offers increased electrode reaction resistance. Additionally, in the measurement electrode, an increased number of pores improve the reactivity with the gas while reducing the electrode reaction resistance, but increases electrode resistivity. Additionally, in the measurement electrode, a reduced number of pores reduce the electrode resistivity, but degrade the reactivity with the gas while increasing the electrode reaction resistance.

An object of the present disclosure is to provide a gas sensor element and a gas sensor that can reduce the electrode reaction resistance and can suppress an increase in electrode resistivity.

An embodiment of the present disclosure lies in a gas sensor element including a solid electrolyte body having oxygen ion conductivity, a measurement electrode provided on one surface of the solid electrolyte body and exposed to a measurement gas, and a reference electrode provided on the other surface of the solid electrolyte body and exposed to a reference gas, wherein
both the measurement electrode and the reference electrode include noble metal particles, solid electrolyte particles having oxygen ion conductivity, and pores,
the measurement electrode includes:
a surface measurement electrode layer including a surface serving as a contact surface with the measurement gas and an intermediate measurement electrode layer disposed in contact with a surface at the solid electrolyte body side of the surface measurement electrode layer, and
the surface measurement electrode layer has a higher porosity than the intermediate measurement electrode layer.

Another embodiment of the present disclosure lies in a gas sensor including the gas sensor element.

The gas sensor element is configured as described above. Thus, in the gas sensor element, the surface measurement electrode layer that includes the surface serving as a contact surface with the measurement gas and that has a high porosity increases the number of three-phase points corresponding to points where surfaces of the noble metal particles, surfaces of the solid electrolyte particles and the pores interact with one another, allowing improvement of reactivity of the measurement gas and a reduction in electrode reaction resistance. Additionally, in the gas sensor element, the intermediate measurement electrode layer located at the solid electrolyte body side and having a lower porosity than the surface measurement electrode layer provides electrode conductivity to allow suppression of an increase in electrode resistivity.

The above-described gas sensor includes the above-described gas sensor element and thus has high electrode activity at low temperature and is advantageous in low-temperature operation.

EMBODIMENT 1

Figure 1:
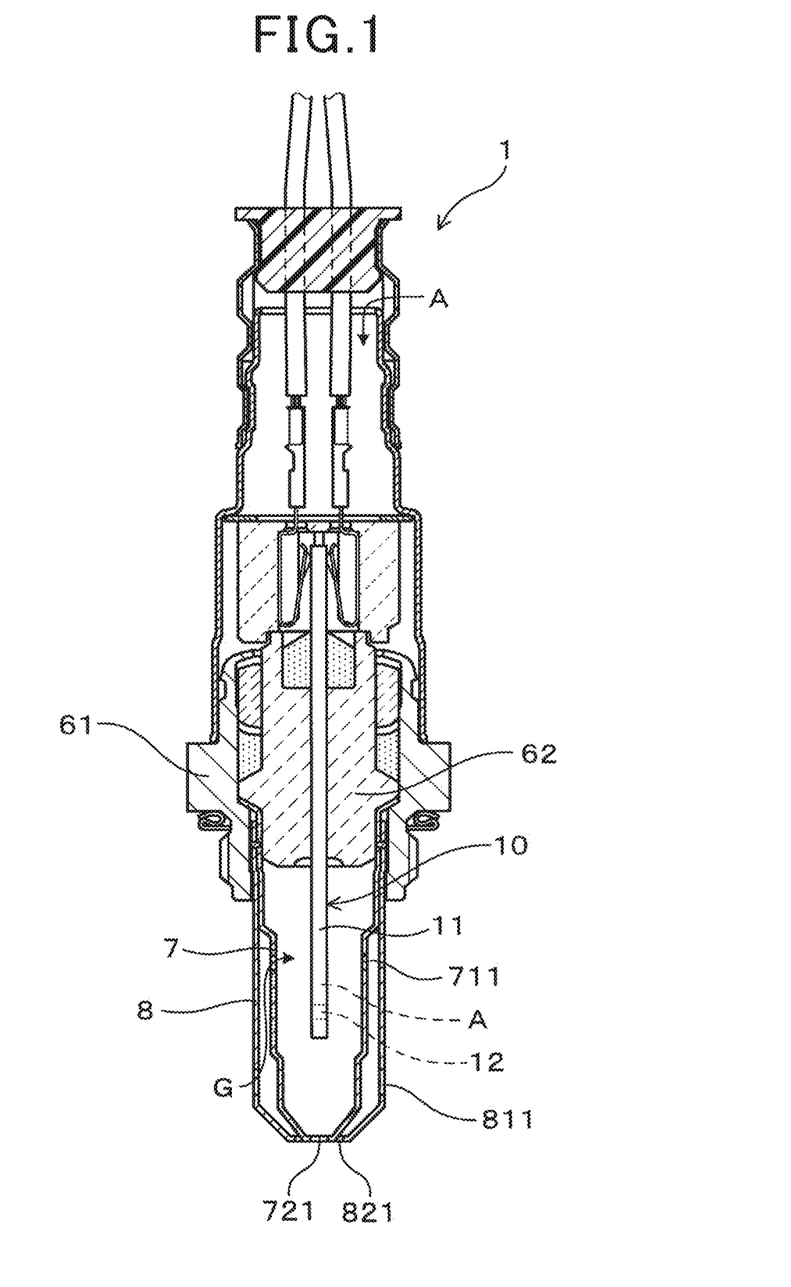
FIG. 1 is a cross-sectional view of a gas sensor of Embodiment 1 including a gas sensor element of Embodiment 1.
Figure 2:
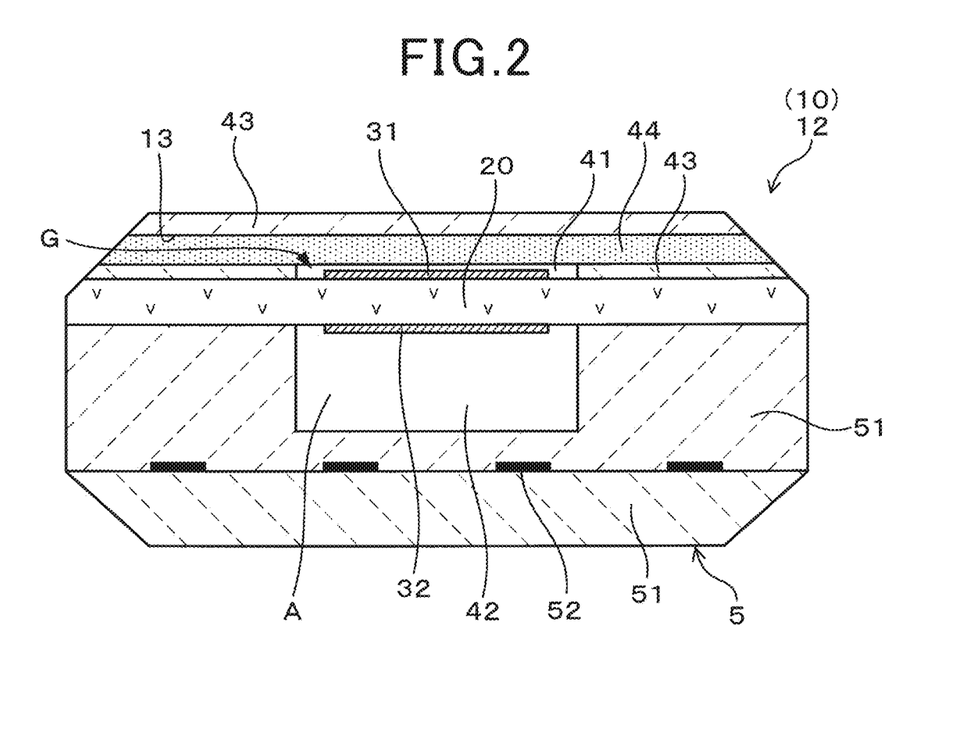
FIG. 2 is a cross-sectional view illustrating the gas sensor element of Embodiment 1 provided in the gas sensor of Embodiment 1 taken in a direction orthogonal to a longitudinal direction of the gas sensor element.
Figure 3:
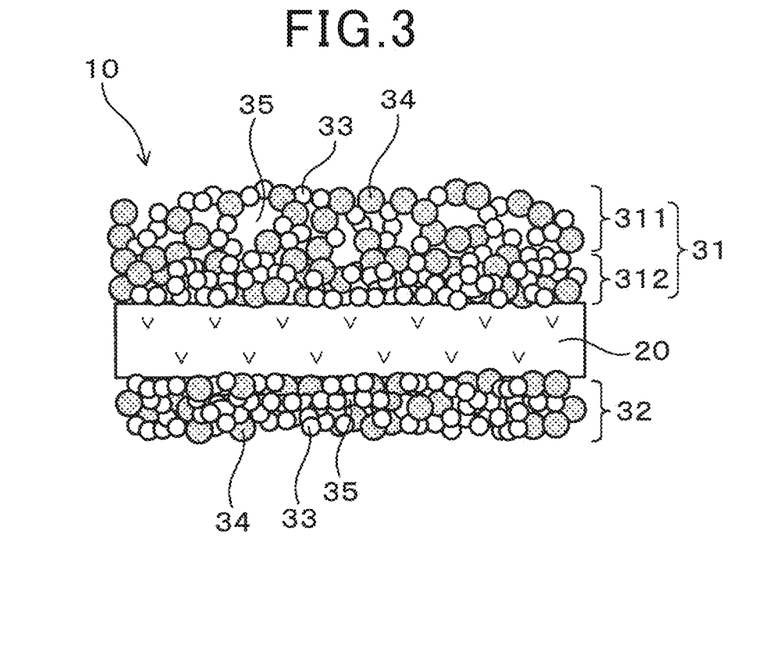
FIG. 3 is a schematic diagram illustrating a microstructure of a measurement electrode and a reference electrode provided in the gas sensor element of Embodiment 1.

A gas sensor element and a gas sensor in Embodiment 1 will be described using FIGS. 1 to 3. As illustrated in FIG. 3, a gas sensor element 10 of the present embodiment includes a solid electrolyte body 20 having oxygen ion conductivity, a measurement electrode 31 provided on one surface of the solid electrolyte body 20 and exposed to a measurement gas G, and a reference electrode 32 provided on the other surface of the solid electrolyte body 20 and exposed to a reference gas A. Both the measurement electrode 31 and the reference electrode 32 include noble metal particles 33, solid electrolyte particles 34 having oxygen ion conductivity, and pores 35. Additionally, as illustrated in FIG. 1 and FIG. 2, a gas sensor 1 of the present embodiment includes the gas sensor element 10 of the present embodiment. Detailed descriptions will be provided below.

As illustrated in FIG. 1 and FIG. 2, the gas sensor 1 is an exhaust system sensor that deals with a measurement gas G corresponding to exhaust gas exhausted from an internal combustion engine and a reference gas A corresponding to atmospheric air and that measures an oxygen concentration, a specific-gas-component concentration, and the like in the measurement gas G. In the present embodiment, the gas sensor 1 is specifically an A/F sensor disposed in an exhaust pipe of an engine as an internal combustion engine and dealing with the measurement gas G corresponding to exhaust gas flowing through the exhaust pipe and the reference gas A corresponding to the atmospheric air to determine the oxygen concentration of the measurement gas G and to determine an A/F (air/fuel ratio) of the engine based on the oxygen concentration. More specifically, the gas sensor 1 can be an A/F sensor utilizing limit current characteristics based on diffusion control of the measurement gas G to quantitively determine the air-fuel ratio of the engine. Alternatively, the gas sensor 1 can be a concentration cell type that detects whether the air/fuel ratio, which is the mixture ratio between fuel and air in the engine, is in a rich state involving an excessive amount of fuel with respect to a theoretical air/fuel ratio or in a lean state involving an excessive amount of air with respect to the theoretical air/fuel ratio. Alternatively, the gas sensor 1 can be configured as a gas sensor other than the A/F sensor. In other words, the gas sensor element 10 of the present embodiment can be applied to any gas sensors as long as the gas sensor includes a gas sensor element with electrodes including noble metal particles, solid electrolyte particles having oxygen ion conductivity, and pores.

In the present embodiment, specifically, the gas sensor 1 includes the gas sensor element 10, an insulator 62 holding the gas sensor element 10, a housing 61 holding the insulator 62, and an inner cover 7 and an outer cover 8 held by the housing 61. The gas sensor element 10 includes a protruding portion 11 protruding from the insulator 62. The inner cover 7 and the outer cover 8 cover the protruding portion 11 of the gas sensor element 10. The protruding portion 11 is provided with a gas measuring section 12 into which the measurement gas G is fed, with the oxygen concentration of the measurement gas G measured. The inner cover 7 is provided with inner through-holes 711 and 721 through which the measurement gas G flows, and the outer cover 8 is provided with outer through-holes 811 and 821 through which the measurement gas G flows. Note that, instead of the double protective cover of the inner cover 7 and the outer cover 8, a single protective cover can be used. Additionally, the arrangement of the inner through-holes 711 and 721 and the outer through-holes 811 and 821 is not particularly limited.

As illustrated in FIG. 2, the gas measuring section 12 includes an introduction section 13 into which the measurement gas G is introduced, the measurement electrode 31 provided on the one surface of the solid electrolyte body 20 and exposed to a measurement gas G, the reference electrode 32 provided on the other surface of the solid electrolyte body 20 and exposed to the reference gas A, and a part of the solid electrolyte body 20 interposed between the measurement electrode 31 and the reference electrode 32. A heater 5 is stacked on the solid electrolyte body 20 in the gas sensor element 10 to heat and activate the solid electrolyte body 20, the measurement electrode 31, and the reference electrode 32.

On the one surface of the solid electrolyte body 20, a measurement gas chamber 41 into which the measurement gas G is introduced is formed, and the measurement electrode 31 is disposed in the measurement gas chamber 41. The measurement gas chamber 41 is formed surrounded by an insulator 43 and a diffusion resistance layer 44 through which the measurement gas G is passed at a predetermined diffusion speed. On the other surface of the solid electrolyte body 20, a reference gas chamber 42 into which the reference gas A is introduced is formed, and the reference electrode 32 is disposed in the reference gas chamber 42. The heater 5 stacked on the solid electrolyte body 20 is provided with heating elements 52 generating heat when a current is conducted through the heating elements 52 and a ceramic substrate 51 in which the heating elements 52 are embedded. The reference gas chamber 42 is formed surrounded by the ceramic substrate 51. The solid electrolyte body 20 is shaped like a plate and formed from a solid electrolyte such as stabilized zirconia containing rare earth metal elements or alkaline earth metal elements, or partially stabilized zirconia. In the present embodiment, the solid electrolyte body 20 can specifically be formed from yttria-partially-stabilized zirconia.

In this case, as illustrated in FIG. 3, both the measurement electrode 31 and the reference electrode 32 include the noble metal particles 33, the solid electrolyte particles 34, and the pores 35.

Examples of noble metal included in the noble metal particles 33 include Pt, Pd, Rh, Ir, Ru, Os, Au, Ag, and alloys thereof. The noble metal included in the noble metal particles 33 can preferably include Pt or an alloy of Pt and at least one selected from a group consisting of Rh, Pd, Au, and Ag. This configuration is excellent in catalytic activity of the electrodes and is thus advantageous in improving electrode reaction resistance during low-temperature operation. Additionally, examples of the solid electrolyte included in the solid electrolyte particles 34 include the above-described solid electrolyte. In the present embodiment, specifically, the noble metal particles 33 can be Pt particles or Pt alloy particles, and the solid electrolyte particles 34 can be zirconia-based solid electrolyte particles such as yttria-stabilized zirconia particles.

Note that points where surfaces of the noble metal particles 33 and surfaces of the solid electrolyte particles 34 and the pores 35 (gas in the pores 35) interact with one another are assumed to be three-phase points (not illustrated) including the noble metal particles 33, the solid electrolyte particles 34 and the pores (gas in the pores 35). Additionally, the mass ratio between the noble metal particles 33 and the solid electrolyte particles 34 can be within a range, for example, from 90:10 to 60:40.

As illustrated in FIG. 3, the measurement electrode 31 includes a surface measurement electrode layer 311 including a surface serving as a contact surface with the measurement gas G, and an intermediate measurement electrode layer 312 disposed in contact with a surface at the solid electrolyte body 20 side of the surface measurement electrode layer 311. Note that, in FIG. 1 and FIG. 2, a detailed stack structure of the measurement electrode 31 is omitted. Additionally, in the example illustrated in the present embodiment, the intermediate measurement electrode layer 312 includes one layer (single layer).

In the gas sensor element 10, the surface measurement electrode layer 311 has a higher porosity than the intermediate measurement electrode layer 312. A magnitude relationship among the porosities can be recognized by observing a cross section perpendicular to an electrode surface using a scanning electron microscope (SEM).

Specifically, the SEM is used to obtain a backscattered electron image of a cross section perpendicular to a surface of the measurement electrode 31. Then, image analysis software (WinROOF manufactured by MITANI CORPORATION) is used to separate, in a brightness distribution, the resultant backscattered electron image into noble metal particle regions, solid electrolyte particle regions, and pore regions. Then, for an image of the pore regions, the area of the entire analysis region in the surface measurement electrode layer 311 and the total area of the pores 35 in the analysis region in the surface measurement electrode layer 311 are determined. Then, the porosity (%) of the surface measurement electrode layer 311 is calculated according to the expression "100×[total area of the pores 35 in the analysis region in the surface measurement electrode layer 311]/[area of the entire analysis region in the surface measurement electrode layer 311]". Similarly, for an image of the pore regions, the area of the entire analysis region in the intermediate measurement electrode layer 312 and the total area of the pores 35 in the analysis region in the intermediate measurement electrode layer 312 are determined. Then, the porosity (%) of the intermediate measurement electrode layer 312 is calculated according to the expression "100×[total area of the pores 35 in the analysis region in the intermediate measurement electrode layer 312]/[area of the entire analysis region in the intermediate measurement electrode layer 312]". This allows recognition of a magnitude relationship between the porosity (%) of the surface measurement electrode layer 311 and the porosity (%) of the intermediate measurement electrode layer 312.

Note that the gas sensor element 10 can be obtained, for example, as described below. A mixture for the intermediate measurement electrode layer 312 including the noble metal particles 33 and the solid electrolyte particles 34, and a pore forming agent as necessary, is applied to the one surface of the solid electrolyte body 20. Furthermore, a mixture for the surface measurement electrode layer 311 including the noble metal particles 33 and the solid electrolyte particles 34, and a pore forming agent as necessary, is applied to the applied mixture. At this time, for satisfaction of the relationship "porosity of the intermediate measurement electrode layer 312<porosity of the surface measurement electrode layer 311", for example, the content of the pore forming agent included in the mixture for the surface measurement electrode layer 311 may be set larger than the content of the pore forming agent included in the mixture for the intermediate measurement electrode layer 312. Alternatively, for example, adjustment may be made for the blend ratio between the noble metal particles 33 and the solid electrolyte particles 34 in the mixture for the surface measurement electrode layer 311 and the blend ratio between the noble metal particles 33 and the solid electrolyte particles 34 in the mixture for the intermediate measurement electrode layer 312. Then, a mixture for the reference electrode 32 including the noble metal particles 33 and the solid electrolyte particles 34, and a pore forming agent as necessary, is applied to the other surface of the solid electrolyte body 20. Then, the resultant solid electrolyte body 20 is fired. Thus, the gas sensor element 10 can be obtained.

The gas sensor element 10 of the present embodiment is configured as described above. Thus, in the gas sensor element 10, the surface measurement electrode layer 311 that includes the surface serving as a contact surface with the measurement gas G and that has a high porosity increases the number of three-phase points corresponding to points where the surfaces of the noble metal particles 33, the surfaces of the solid electrolyte particles 34, and the pores 35 interact with one another, allowing improvement of reactivity of the measurement gas G and a reduction in electrode reaction resistance. Additionally, in the gas sensor element 10, the intermediate measurement electrode layer 312 located at the solid electrolyte body 20 side and having a lower porosity than the surface measurement electrode layer 311 provides electrode conductivity to allow suppression of an increase in electrode resistivity.

In the gas sensor element 10, the surface measurement electrode layer 311 can have a porosity of 15% or more and 30% or less. This configuration increases opportunities for contact with the measurement gas G to improve the reactivity of the measurement gas G, facilitating a reduction in electrode reaction resistance. Additionally, an electron conduction path is formed in the surface measurement electrode layer 311 due to an appropriate amount of pores, facilitating suppression of an increase in electrode resistivity. The porosity of the surface measurement electrode layer 311 can be preferably 16% or more, more preferably 17% or more, and even more preferably 18% or more in view of a reduction in electrode reaction resistance and the like. Additionally, the porosity of the surface measurement electrode layer 311 can be preferably 29% or less, more preferably 28% or less, and even more preferably 27% or less in view of improvement of electron conductivity based on suppression of an increase in electrode resistivity.

In the gas sensor element 10, the intermediate measurement electrode layer 312 can have a porosity of 15% or less. This configuration can ensure an electron conduction path in the intermediate measurement electrode layer 312 due to an appropriate amount of pores, facilitating suppression of an increase in electrode resistivity. The porosity of the intermediate measurement electrode layer 312 can be preferably less than 15%, more preferably 14% or less, even more preferably 13% or less, and furthermore preferably 12% or less in view of a reduction in electrode reaction resistance and the like. Additionally, the porosity of the intermediate measurement electrode layer 312 can be, for example, 3% or more in view of relaxation of stress caused by thermal expansion between the solid electrolyte body 20 and the surface measurement electrode layer 311.

In the gas sensor element 10, each of the surface measurement electrode layer 311 and the intermediate measurement electrode layer 312 can preferably have a thickness of from 1 to 10 μm in view of ease of formation using a printing method such as screen printing. Additionally, the reference electrode 32 can preferably have a thickness of from 2 to 20 μm in view of ease of formation using a printing method such as screen printing.

The gas sensor 1 of the present embodiment includes the gas sensor element 10 of the present embodiment described above. Thus, the gas sensor 1 has high electrode activity at low temperature and is advantageous in low-temperature operation. The gas sensor 1 can specifically be used within, for example, a temperature range from 550 to 800° C.

EMBODIMENT 2

A gas sensor element and a gas sensor according to Embodiment 2 will be described using FIG. 4. Note that those of the reference symbols used in Embodiment 2 and subsequent embodiments and experimental examples which are the same as the reference symbols used in the preceding embodiment represent components similar to the corresponding components in the preceding embodiment.

Figure 4:
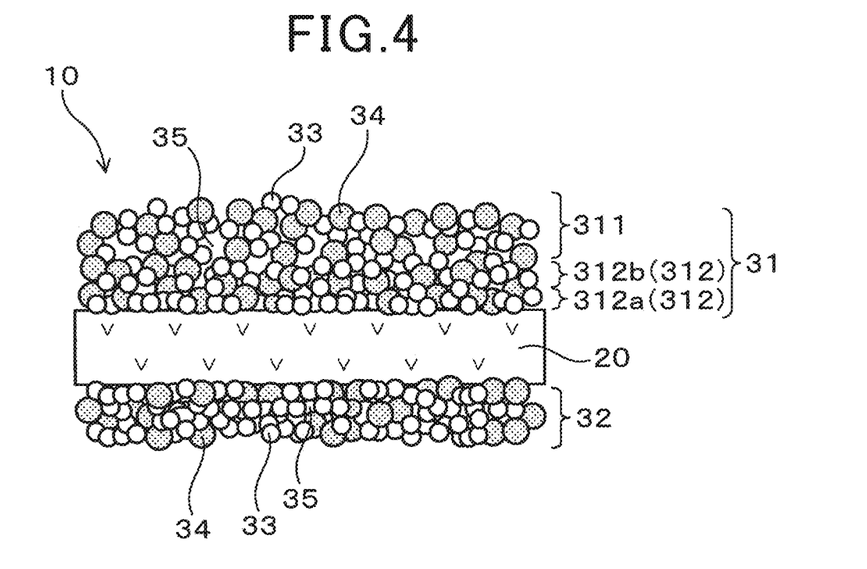
FIG. 4 is a schematic diagram illustrating a microstructure of a measurement electrode and a reference electrode provided in the gas sensor element of Embodiment 2.

As illustrated in FIG. 4, in the gas sensor element 10 of the present embodiment, the intermediate measurement electrode layer 312 includes a plurality of layers.

This configuration enables control of the porosity of each of the layers included in the intermediate measurement electrode layer 312, providing a gas sensor element 10 allowing the above-described functions and effects to be easily obtained. The porosity of each layer can be controlled by, for example, adjusting the mixture ratio between the noble metal particles 33 and the solid electrolyte particles 34 included in each layer.

FIG. 4 illustrates an example in which the intermediate measurement electrode layer 312 includes at least two layers including an inner layer 312a and an outer layer 312b. The intermediate measurement electrode layer 312 is not limited to FIG. 4 but may include three or more layers.

Each of the layers included in the intermediate measurement electrode layer 312 can specifically have a porosity increasing with decreasing distance to the surface measurement electrode layer 311 and decreasing consistently with distance to the solid electrolyte body 20. More specifically, each of the layers included in the intermediate measurement electrode layer 312 can have a porosity increasing from the solid electrolyte body 20 toward the surface measurement electrode layer 311. However, each of the layers included in the intermediate measurement electrode layer 312 has a lower porosity than the surface measurement electrode layer 311. Each of the layers included in the intermediate measurement electrode layer 312 can specifically have a porosity of 15% or less. The other components and functions and effects are similar to the corresponding components and functions and effects of Embodiment 1.

The gas sensor 1 of the present embodiment includes the gas sensor element 10 of the present embodiment described above. The other components and functions and effects are similar to the corresponding components and functions and effects of Embodiment 1.

EMBODIMENT 3

A gas sensor element and a gas sensor according to Embodiment 3 will be described using FIG. 5.

Figure 5:
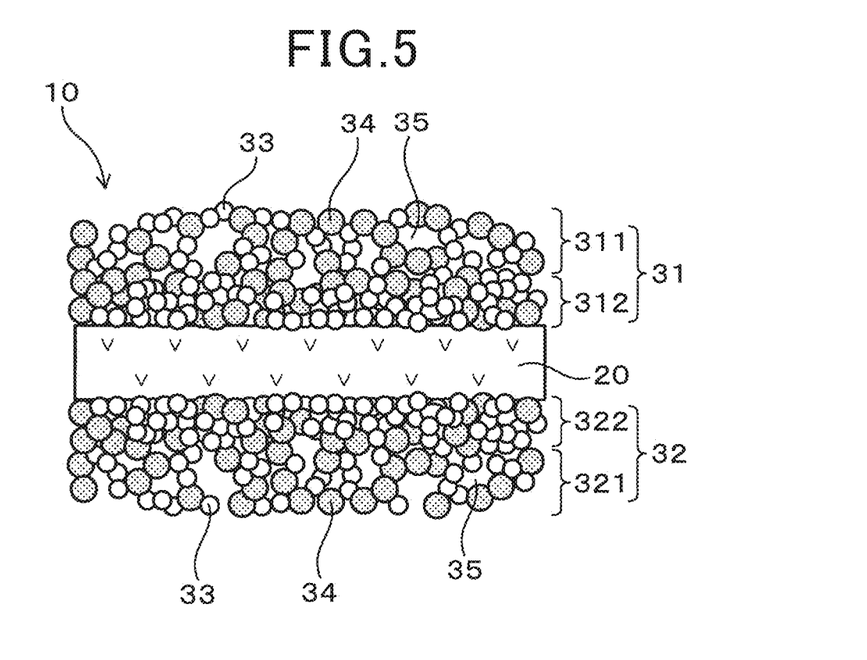
FIG. 5 is a schematic diagram illustrating a microstructure of a measurement electrode and a reference electrode provided in the gas sensor element of Embodiment 3.

As illustrated in FIG. 5, in the gas sensor element 10 of the present embodiment, the reference electrode 32 includes a surface measurement electrode layer 321 including a surface serving as a contact surface with the reference gas A, and an intermediate measurement electrode layer 322 disposed in contact with a surface of the surface measurement electrode layer 321 located at the solid electrolyte body 20 side. In the gas sensor element 10, the surface measurement electrode layer 311 has a higher porosity than the intermediate measurement electrode layer 312.

The gas sensor element 10 of the present embodiment is configured as described above. Thus, in the gas sensor element 10, the surface measurement electrode layer 321 that includes the surface serving as a contact surface with the reference gas A and that has a high porosity increases the number of three-phase points corresponding to points where the surfaces of the noble metal particles 33, the surfaces of the solid electrolyte particles 34, and the pores 35 interact with one another, allowing improvement of reactivity of the reference gas A and a reduction in electrode reaction resistance. Additionally, in the gas sensor element 10, the intermediate measurement electrode layer 322 located closer to the solid electrolyte body 20 and having a lower porosity than the surface measurement electrode layer 321 provides electrode conductivity to allow suppression of an increase in electrode resistivity.

Thus, in the gas sensor element 10 of the present embodiment, the effects of the measurement electrode 31 and the reference electrode 32 are synergized to enable a further reduction in electrode reaction resistance and more effective suppression of an increase in electrode resistivity.

Note that the other components and functions and effects are similar to the corresponding components and functions and effects of Embodiment 1. However, for the configuration of the surface measurement electrode layer 321, the "surface measurement electrode layer 311" in Embodiment 1 can be interpreted as the "surface measurement electrode layer 321". Similarly, for the configuration of the intermediate measurement electrode layer 322, the "intermediate measurement electrode layer 312" in Embodiment 1 can be interpreted as the "intermediate measurement electrode layer 322".

The gas sensor 1 of the present embodiment includes the gas sensor element 10 of the present embodiment described above. The other components and functions and effects are similar to the corresponding components and functions and effects of Embodiment 1.

EXPERIMENTAL EXAMPLE 1

A paste for intermediate measurement electrode layer formation including noble metal particles, solid electrolyte particles, and a pore forming agent was screen-printed on one surface of a solid electrolyte body at a thickness of 7 μm. Then, a paste for surface measurement electrode layer formation including noble metal particles, solid electrolyte particles, and a pore forming agent was screen-printed on the screen-printed paste at a thickness of 7 μm. Note that the mass ratio between the noble metal particles and the solid electrolyte particles in the paste for intermediate measurement electrode layer formation is 97:3. Additionally, the mass ratio between the noble metal particles and the solid electrolyte particles in the paste for surface measurement electrode layer formation is 96:4. Then, a paste for reference electrode formation including noble metal particles, solid electrolyte particles, and a pore forming agent was screen-printed on the other surface of the solid electrolyte body at a thickness of 7 μm. Note that the mass ratio between the noble metal particles and the solid electrolyte particles in the paste for reference electrode formation is 97:3. In the above description, yttria-partly-stabilized zirconia was used as the solid electrolyte body. Pt particles (primary particle size: from 0.6 to 10 μm) were used as the noble metal particles. Yttria-partly-stabilized zirconia (primary particle size: from 0.2 to 3 μm) were used as the solid electrolyte particles. Then, the solid electrolyte body with the pastes printed thereon was fired at 1450° C. Thus, a gas sensor element of sample 1 was obtained.

A gas sensor of sample 1C was obtained as is the case with the production of the gas sensor element of sample 1 except that only the paste for intermediate measurement electrode layer formation was screen-pasted on the one surface of the solid electrolyte body at a thickness of 14 μm, with the subsequent screen printing of the paste for surface measurement electrode layer formation omitted.

Figure 6:
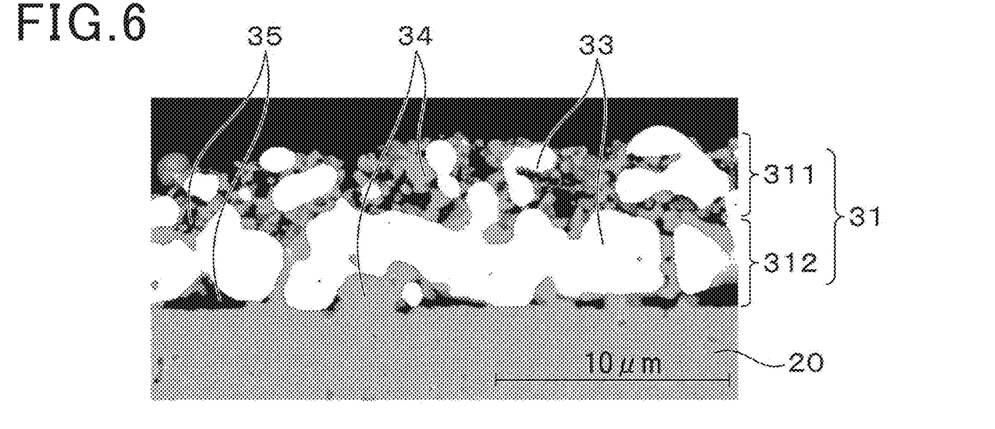
FIG. 6 is a backscattered electron image captured with a scanning electron microscope and illustrating a microstructure of a measurement electrode in a gas sensor element in sample 1, in Experimental Example 1.
Figure 7:
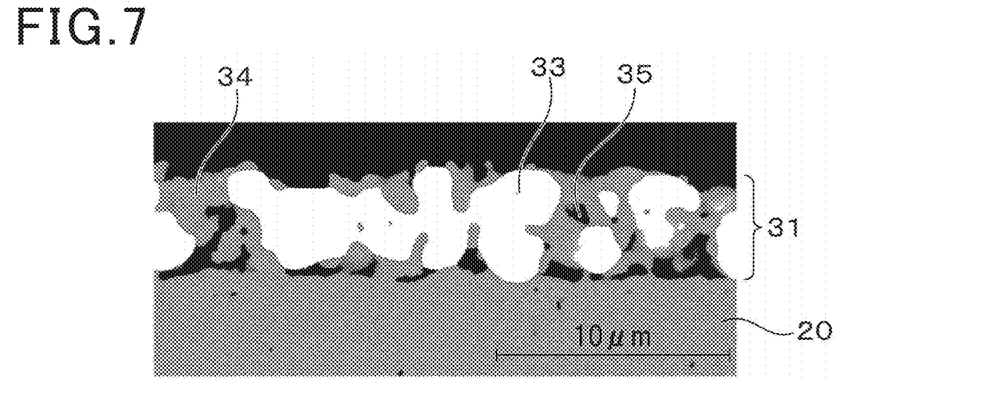
FIG. 7 is a backscattered electron image captured with the scanning electron microscope and illustrating a microstructure of a measurement electrode in a gas sensor element in sample 1C, in Experimental Example 1.
Figure 8:
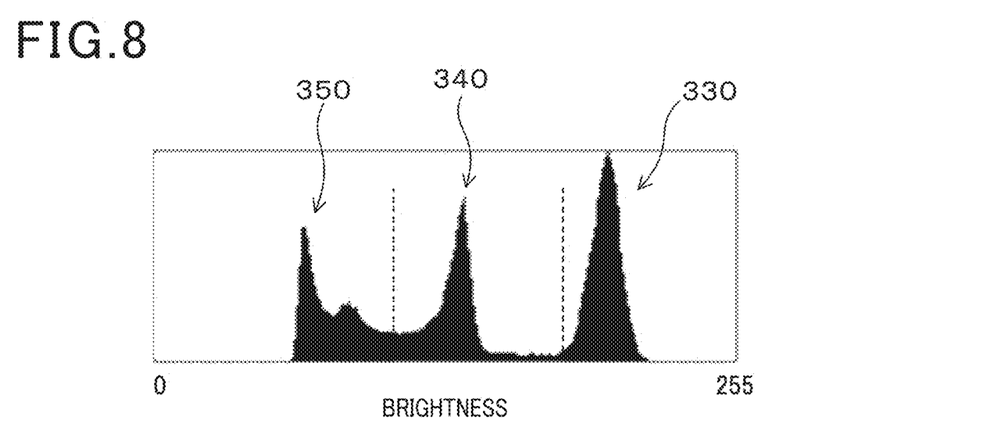
FIG. 8 is a diagram of an example in which the backscattered electron image of the measurement electrode is separated, in a brightness distribution, into a noble metal particle region, a solid electrolyte body particle region, and a pore region in Experimental Example 1.
Figure 9:
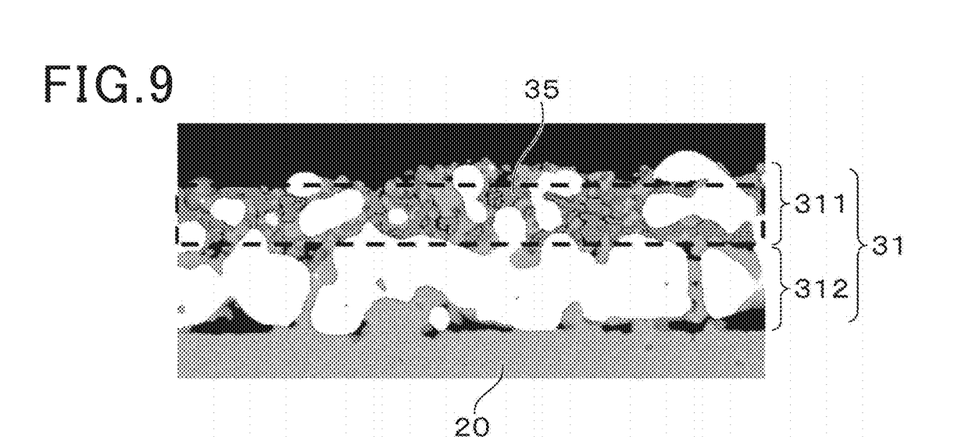
FIG. 9 is a diagram of an example of an image of the pore region used in calculation of porosity of a surface measurement electrode layer in Experimental Example 1.
Figure 10:
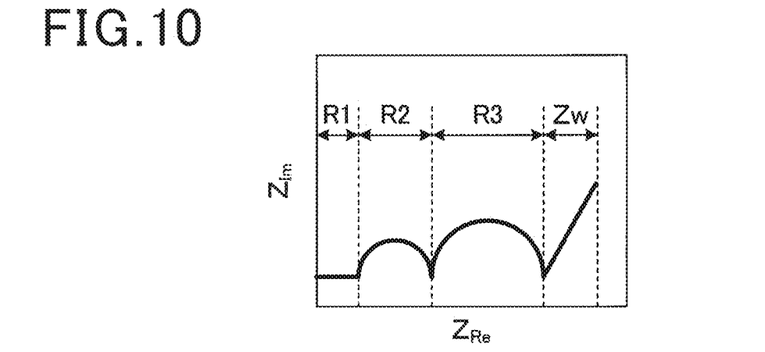
FIG. 10 is a schematic diagram of a Cole-Cole plot used in determination of electrode reaction resistance in Experimental Example 1.

An SEM was used to observe cross-section of a measurement electrode of the gas sensor element of each sample. FIG. 6 and FIG. 7 show the results. FIG. 7 shows that, in the gas sensor element of sample 1C, the measurement electrode includes a single layer. In contrast, FIG. 6 shows that, in the gas sensor element of sample 1 the measurement electrode includes noble metal particles, solid electrolyte particles having oxygen ion conductivity, and pores and that the measurement electrode includes a surface measurement electrode layer including a surface serving as a contact surface with the measurement gas and an intermediate measurement electrode layer disposed in contact with a surface at the solid electrolyte body side of the surface measurement electrode layer. Additionally, according to measurement by the above-described measurement method, the surface measurement electrode layer has a porosity of 22%, the intermediate measurement electrode layer has a porosity of 8%, and the surface measurement electrode layer has a higher porosity than the intermediate measurement electrode layer has. Note that FIG. 8 shows an example in which a backscattered electron image of the measurement electrode 31 is separated, in a brightness distribution, into noble metal particle regions 330, solid electrolyte body particle regions 340, and pore regions 350. FIG. 9 illustrates an example of an image of the pore regions used in calculation of the porosity of the surface measurement electrode layer.

For the gas sensor element of each sample, the electrode reaction resistance of the measurement electrode was measured. Specifically, impedance measurement at a frequency of from 1 MHz to 0.1 Hz was performed on the measurement electrode to measure the intragrain resistance of the solid electrolyte particles and the grain boundary resistance and electrode reaction resistance of the solid electrolyte particles at from 550 to 800° C., and the electrode reaction resistance was analyzed based on a Cole-Cole plot as illustrated in FIG. 9. Note that, in FIG. 9, R1 denotes the intragrain resistance of the solid electrolyte particles. R2 denotes the grain boundary resistance of the solid electrolyte particles. R3 denotes the electrode reaction resistance. Zw denotes gas diffusion resistance. $Z_{Re}$ denotes a real-number component of impedance. $Z_{Im}$ denotes an imaginary-number component of the impedance.

Figure 11:
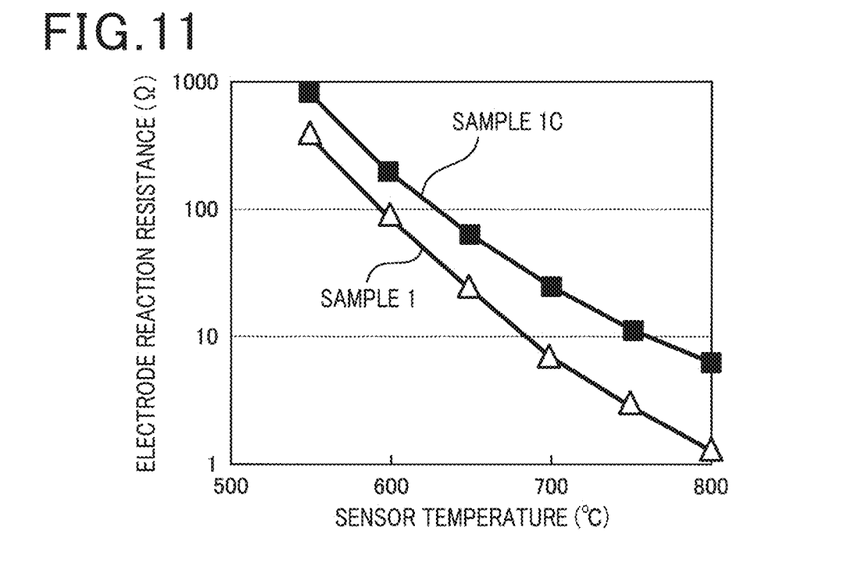
FIG. 11 is a graph indicating a relationship between a sensor temperature (° C.) and electrode reaction resistance ($\Omega$) in Experimental Example 1.

FIG. 11 shows a relationship between a sensor temperature (° C.) and the electrode reaction resistance (Ω). As shown in FIG. 11, compared to the gas sensor element of sample 1C, the gas sensor element of sample 1 offers low electrode reaction resistance all over a sensor temperature range.

For the gas sensor element of each sample, the electrode resistivity of the measurement electrode was measured. Specifically, electric resistance was measured at both ends of the measurement electrode formed on the solid electrolyte body, and the electrode resistivity was determined from the measured dimensions (width, length, and thickness) of the measurement electrode according to the following equation.

[Electrode resistivity(Ω·cm)]=[electric resistance (Ω)]×[width (cm)]×[thickness (cm)]/[length (cm)]

As a result, the electrode resistivity of the measurement electrode in the gas sensor element of sample 1 was 21 (Ω·cm), and the electrode resistivity of the measurement electrode in the gas sensor element of sample 1C was 20 (Ω·cm). The results indicate that, compared to the gas sensor element of sample 1C, the gas sensor element of sample 1 can suppress an increase in electrode resistivity.

EXPERIMENTAL EXAMPLE 2

According to the production of the gas sensor element of sample 1, a plurality of gas sensor elements were produced such that the respective surface measurement electrode layers had different porosities, and the relationship between the porosity and electrode reaction resistance of the surface measurement electrode layer was determined. The results are shown in FIG. 12.

Figure 12:
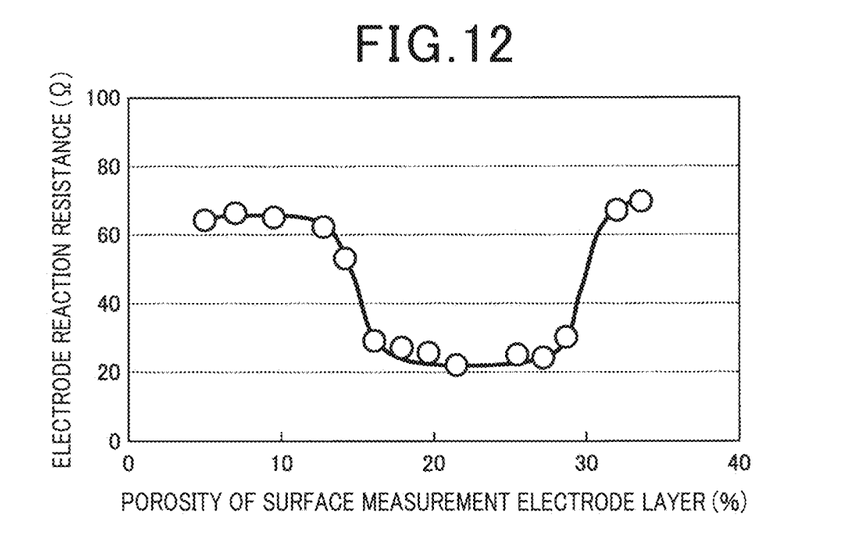
FIG. 12 is a graph indicating a relationship between porosity (%) and electrode reaction resistance ($\Omega$) of a surface measurement electrode layer in Experimental Example 2.

As shown in FIG. 12, in a case where the porosity of the surface measurement electrode layer in the gas sensor element is indicated as 15% or more and 30% or less, the electrode resistivity can be easily reduced. This is because, in the above-described case, increased opportunities for contact with the measurement gas improve the reactivity of the measurement gas.

EXPERIMENTAL EXAMPLE 3

According to the production of the gas sensor element of sample 1, a plurality of gas sensor elements were produced such that the respective intermediate measurement electrode layers had different porosities, and the relationship between the porosity and electrode reaction resistance of the intermediate measurement electrode layer was determined. The results are shown in FIG. 13.

Figure 13:
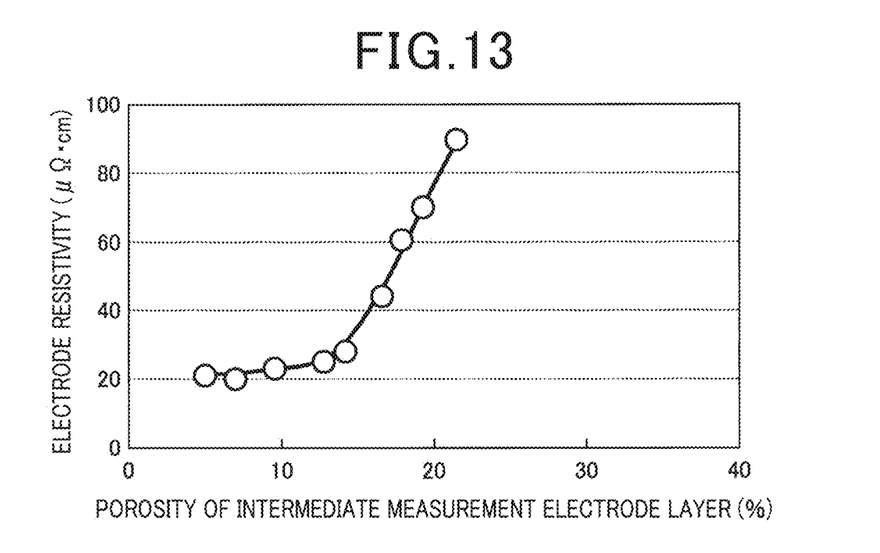
FIG. 13 is a graph indicating a relationship between porosity (%) and electrode reaction resistance ($\Omega$) of an intermediate measurement electrode layer in Experimental Example 3.

As shown in FIG. 13, in a case where the porosity of the intermediate measurement electrode layer in the gas sensor element is indicated as 15% or less, the electrode resistivity can be easily reduced. This is because, in this case, an appropriate amount of pores allows an electron conduction path to be easily formed in the intermediate measurement electrode layer.

EXPERIMENTAL EXAMPLE 4

Figure 14:
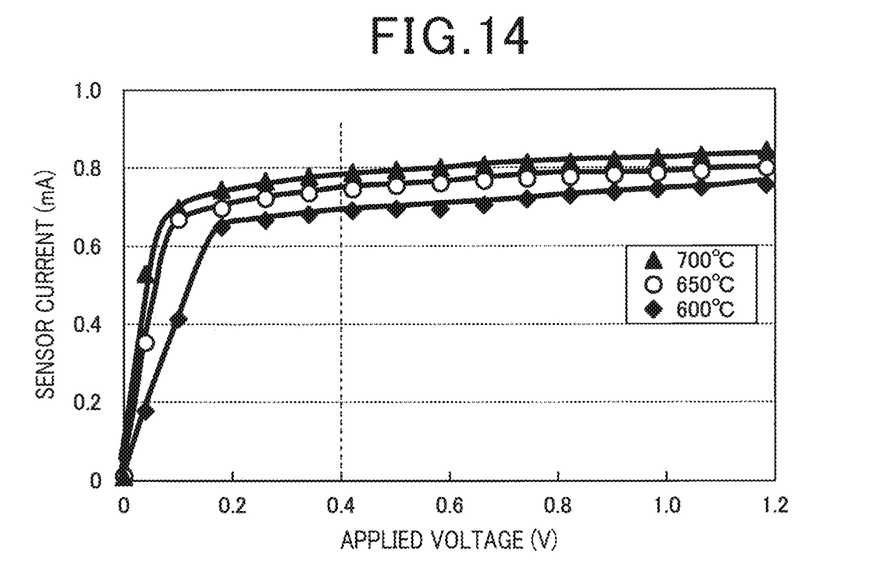
FIG. 14 is a graph indicating a relationship between an applied voltage (V) and a sensor current (mA) of a gas sensor of sample 1, in Experimental Example 4.
Figure 15:
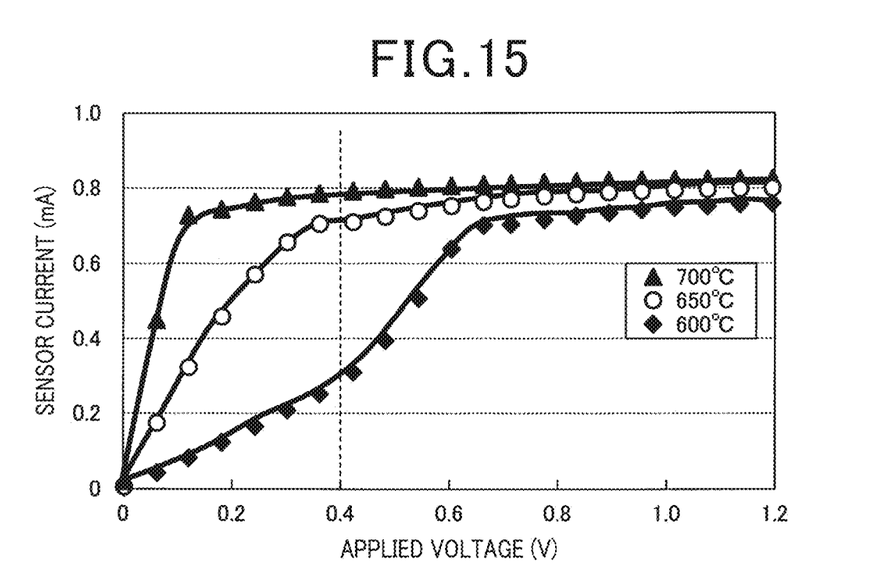
FIG. 15 is a graph indicating a relationship between an applied voltage (V) and a sensor current (mA) of a gas sensor of sample 1C, in Experimental Example 4.

Using the gas sensor of sample 1 with the gas sensor element of sample 1 integrated therein, the relationship between an applied voltage and a sensor current of the gas sensor was measured in the atmospheric air with temperature set to 600° C., 650° C., and 700° C. The results are shown in FIG. 14. Additionally, using the gas sensor of sample 1C with the gas sensor element of sample 1C integrated therein, the relationship between an applied voltage and a sensor current of the gas sensor was measured in the atmospheric air with temperature set to 600° C., 650° C., and 700° C. The results are shown in FIG. 15. Note that, in the present experimental example, the gas sensor is used as an A/F (air/fuel) sensor and configured to determine an air-/fuel ratio by measuring a current value at 0.4 V.

As shown in FIG. 15, the gas sensor of sample 1C fails to obtain stable output at low temperatures of 600° C. and 650° C. In contrast, as shown in FIG. 14, the gas sensor of sample 1 can obtain stable output all over the temperature range including 600° C., 650° C., and 700° C. The results indicate that the gas sensor of sample 1 has high electrode activity at low temperature and is advantageous in low-temperature operation, enabling a reduction in the usage of heaters to save energy.

The present disclosure is not limited to the above-described embodiments or experimental examples, and various changes can be made to the embodiments or experimental examples without departing from the gist of the present disclosure. That is, it is comprehended that the present disclosure has been described in compliance with the embodiments but is not intended to be limited to the embodiments, structures, or the like. The present disclosure includes various modifications and variations within the scope of equivalent. In addition, the scope and the range of ideas of the present disclosure include various combinations and forms, and other combinations and forms corresponding to the foregoing combinations and forms with addition of only one element, two or more elements, or a partial element. Additionally, the configurations illustrated in the embodiments and experimental examples can be arbitrary combined. For example, the configuration of the reference electrode in Embodiment 1 can be replaced with the configuration of the reference electrode in Embodiment 3. Alternatively, the configuration of the reference electrode in Embodiment 2 can be replaced with the configuration of the reference electrode in Embodiment 3. Additionally, in each of the modifications, the intermediate measurement electrode layer included in each reference electrode can include a plurality of layers.

What is claimed is:

1. A gas sensor element comprising:
a solid electrolyte body having oxygen ion conductivity, a measurement electrode provided on a first surface of the solid electrolyte body and exposed to a measurement gas, and a reference electrode provided on a second surface of the solid electrolyte body that is opposite to the first surface and exposed to a reference gas, wherein
both the measurement electrode and the reference electrode comprise noble metal particles, solid electrolyte particles having oxygen ion conductivity, and pores, and
the measurement electrode comprises:
a surface measurement electrode layer comprising a surface serving as a contact surface with the measurement gas and an intermediate measurement electrode layer comprising a plurality of layers, one layer of the intermediate measurement electrode layer being disposed in contact with a surface at a solid electrolyte body side of the surface measurement electrode layer, and
the surface measurement electrode layer has a higher porosity than porosity of each of the plurality of layers of the intermediate measurement electrode layer, and
each of the plurality of layers included in the intermediate measurement electrode layer have a porosity increasing from the solid electrolyte body toward the surface measurement electrode layer.

2. The gas sensor element according to claim 1, wherein the surface measurement electrode layer has a porosity of 15% or more and 30% or less.

3. The gas sensor element according to claim 1, wherein each of layers of the intermediate measurement electrode layer has a porosity of 15% or less.

4. The gas sensor element according to claim 1, wherein the reference electrode comprises:
a surface measurement electrode layer comprising a surface serving as a contact surface with the reference gas and an intermediate measurement electrode layer disposed in contact with a surface at a solid electrolyte body side of the surface measurement electrode layer of the reference electrode, and
the surface measurement electrode layer of the reference electrode has a higher porosity than the intermediate measurement electrode layer of the reference electrode.

5. The gas sensor element according to claim 4, wherein the surface measurement electrode layer of the reference electrode has a porosity of 15% or more and 30% or less.

6. The gas sensor element according to claim 4, wherein the intermediate measurement electrode layer of the reference electrode has a porosity of 15% or less.

7. The gas sensor element according to claim 4, wherein the intermediate measurement electrode layer of the reference electrode comprises a plurality of layers.

8. The gas sensor element according to claim 1, wherein the noble metal particles comprise Pt or an alloy of Pt and at least one type selected from a group consisting of Rh, Pd, Au, and Ag.

9. A gas sensor comprising the gas sensor element according to claim 1.

* * * * *